(12) United States Patent
Bergqvist (10) Patent No.: US 11,542,908 B2
(45) Date of Patent: Jan. 3, 2023

(54) SUBMERSIBLE POWER PLANT FOR PRODUCING ELECTRICAL POWER (71) Applicant: Minesto AB, Västra Frölunda (SE)

(72) Inventor: Björn Bergqvist, Gothenburg (SE)

(73) Assignee: Minesto AB, Vastra Frolunda (SE)

( * ) Notice: Subject to any disclaimer, the term of this patent is extended or adjusted under 35 U.S.C. 154(b) by 0 days.

(21) Appl. No.: 17/416,187

(22) PCT Filed: Dec. 20, 2018

(86) PCT No.: PCT/SE2018/051348
§ 371 (c)(1),
(2) Date: Jun. 18, 2021

(87) PCT Pub. No.: WO2020/130897
PCT Pub. Date: Jun. 25, 2020

(65) Prior Publication Data
US 2022/0049677 A1 Feb. 17, 2022

(51) Int. Cl.
*F03B 13/10* (2006.01)
*H02K 7/18* (2006.01)

(52) U.S. Cl.
CPC ........... *F03B 13/10* (2013.01); *H02K 7/1823* (2013.01); *F05B 2240/9174* (2020.08); *F05B 2240/97* (2013.01)

(58) Field of Classification Search
CPC .......... F03B 13/10; F03B 13/26; F03B 17/06; H02K 7/1823; F05B 2240/9174; F05B 2240/97; F05B 2240/917; Y02E 10/30
(Continued)

(56) References Cited

U.S. PATENT DOCUMENTS

| 2006/0222461 A1 | 10/2006 | Manchester |
| 2011/0266805 A1 | 11/2011 | Landberg |
| 2016/0013703 A1* | 1/2016 | Marzelius ................. F03D 5/00 290/43 |

FOREIGN PATENT DOCUMENTS

| EP | 1816345 A1 | 8/2007 |
| JP | 2006-520870 A | 9/2006 |

(Continued)

OTHER PUBLICATIONS

International Search Report and Written Opinion received for PCT/SE2018/051348, dated Aug. 14, 2019.
(Continued)

*Primary Examiner* — Charles Reid, Jr.
(74) *Attorney, Agent, or Firm* — Marshall, Gerstein & Borun LLP (57) ABSTRACT

A submersible power plant and a method for providing a submersible power plant. The submersible power plant includes an anchoring provided at a minimum depth and a vehicle including at least one wing. The vehicle is arranged to be secured to the anchoring by at least one tether rotatably attached to the anchoring by an anchoring coupling and attached to the vehicle by at least one vehicle coupling. The submersible power plant is completely submerged in a body of fluid both during operation and non-operation of the submersible power plant and the tether has an unextended tether length between 2-20 times a wingspan of the wing, specifically between 3-12 times the wingspan of the wing, more specifically between 5-10 times the wingspan of the wing.

15 Claims, 3 Drawing Sheets

(58) Field of Classification Search
USPC .......................................... 290/42, 43, 53, 54
See application file for complete search history.

(56) References Cited

FOREIGN PATENT DOCUMENTS

| | | |
|---|---|---|
| JP | 2009-525427 A | 7/2009 |
| JP | 2016-505120 A | 2/2016 |
| JP | 2016-516156 A | 6/2016 |
| WO | WO-2007/086037 A1 | 8/2007 |
| WO | WO-2014120058 A1 | 8/2014 |
| WO | WO-2017/176179 A1 | 10/2017 |

OTHER PUBLICATIONS

Notification of Transmittal of the International Preliminary Report on Patentability, dated Dec. 23, 2020.
Japanese Office Action, Japanese Application No. 2021-535267, dated Oct. 3, 2022.

\* cited by examiner

SUBMERSIBLE POWER PLANT FOR PRODUCING ELECTRICAL POWER

TECHNICAL FIELD

The invention relates to a submersible power plant for producing electrical power. The submersible power plant comprises an anchoring provided at a minimum depth Dmin and a vehicle comprising at least one wing. The vehicle is arranged to be secured to the anchoring by means of at least one tether rotatably attached to the anchoring by means of an anchoring coupling and attached to the vehicle by means of at least one vehicle coupling. The vehicle is arranged to move in a predetermined trajectory by means of a fluid stream passing the wing during operation of the submersible power plant. The vehicle is arranged to stay in a position essentially above the anchoring during non-operation of the submersible power plant. The invention also relates to a method for providing a submersible power plant.

BACKGROUND ART

Current solutions of submersible power plants require a tether with a length exceeding the water depth of the water column that the submersible power plant is installed in in order to easily install and recover the vehicle of the submersible power plant. This condition introduces the complexity of always keeping the vehicle of the submersible power plant submerged in slack water when the direction of the tide changes or during other low flow conditions. This requires complex control systems and buoyancy restraints for various parts of the submersible power plant.

The tether itself further introduces overall drag on the system thereby reducing performance. The drag is a function of the tether length, i.e., the longer the tether, the higher the drag. This is of even more importance when considering expanding the technology into deeper waters as the drag introduced by the tether will make the submersible power plant very difficult to operate efficiently.

There is thus a need for an improvement within the field of submersible power plants.

SUMMARY OF THE INVENTION

One object of the present invention is to provide an inventive submersible power plant and a method for providing a submersible power plant for producing electrical power where the previously mentioned problems are at least partly avoided.

The invention relates to a submersible power plant for producing electrical power. The submersible power plant comprises an anchoring provided at a minimum depth Dmin and a vehicle comprising at least one wing. The vehicle is arranged to be secured to the anchoring by means of at least one tether rotatably attached to the anchoring by means of an anchoring coupling and attached to the vehicle by means of at least one vehicle coupling. The vehicle is arranged to move in a predetermined trajectory by means of a fluid stream passing the wing during operation of the submersible power plant and arranged to stay in a position essentially above the anchoring during non-operation of the submersible power plant. The tether has an unextended tether length such that the submersible plant is completely submerged in a body of fluid during operation and non-operation of the submersible power plant. The unextended tether length is between approximately 2-20 times a wingspan of the wing, specifically between approximately 3-12 times the wingspan of the wing, more specifically between approximately 5-10 times the wingspan of the wing.

By having the submersible power plant being completely submerged both during operation and non-operation of the submersible power plant, while at the same time providing a tether with a tether length that is between approximately between 2-20 times the wingspan of the wing, enables a submersible power plant that can be installed at a safe clearance depth without risking interfering with e.g. shipping lanes while at the same time providing a relationship between the tether length and the wing span of the vehicle that ensures a desirable lift to drag ratio.

When the unextended tether length is short in relation to the wingspan of the wing, the predetermined trajectory is small, which means that the vehicle turns all the time. Generally, shorter tether lengths, e.g. a tether length of approximately 2-5 times the wingspan of the wing allow a much higher packing density in an array, i.e. more power plants per unit area, as well as opening for installation in shallower waters.

When the unextended tether length is long, the vehicle is able to move along parts of the predetermined trajectory without turning and/or turn over much larger radii. This lowers the variation in velocity (and speed) and also lowers the number of cycles (fatigue etc.). Generally, longer tether lengths, e.g. a tether length of approximately 15-20 times the wingspan of the wing allow for deeper water installations.

Tether lengths between 5 and 15 times the wingspan of the wing can be used at installation depths that fall between suitable installation depths for the shorter and the longer tether lengths and also allow for optimization of the predetermined trajectory.

The solution presented in the application is intended to simplify operation of the submersible power plant by avoiding on-board systems designed to keep the vehicle submerged at all times which is necessary when the tether length is of such a length that the vehicle surfaces during non-operation.

By having an anchoring that not necessarily is provided at a seabed, lake bed or stream bed, the submersible power plant can versatilely be installed at depths which otherwise would be difficult to exploit. Thus, this solution can allow installation of the submersible power plant at sites with greater depths, possibly making the system independent of site depth when designing the tether by having the tether attached to an anchoring which in turn can be attached to the seabed far below the anchoring. This also results in that the vehicles of the submersible power plant can be designed with much larger wings, which makes them operable in lower flow velocities than what is possible today. Power generation from ocean currents are one example of when lower flow velocities can be utilized in such cases.

The tether can in this way be designed solely for performance and reliability and not for surface operations. Also, the solution results in shorter tethers than used today, lowering the cost for the tether. Electrical losses in the tether are also reduced as the tether can be made shorter.

Additional advantages with the solution are:

The parking position of the vehicle in no-flow or close to no-flow conditions is essentially straight above the anchoring. Today, the parking position of the vehicle is off-set from being above the foundation, meaning that the vehicle parks at a distance from a position directly above the foundation.

Slack water turns can be executed simply by allowing the vehicle to rotate around its vertical axis.

The tether will produce less overall system drag, returning a higher efficiency in the system.

Systems on board the vehicle can be removed and/or reduced in complexity, lowering cost and enhancing reliability.

The tether length is thus smaller than the minimum depth Dmin.

The submersible power plant can be installed such that the anchoring is a foundation provided on e.g. a seabed, lake bed or stream bed. When the anchoring is a foundation, installed on a seabed, both tidal currents, where the flow velocity is periodical in nature, and ocean currents, which have a more permanent flow velocity, can be utilized for power generation. When the submersible power plant is installed on a lake bed, the flow velocity from currents within the lake or resulting from that a river is connected to the lake can be utilized for power generation. When the submersible power plant is installed on a stream bed, e.g. a riverbed, the flow velocity of the flowing water in the river can be utilized for power generation. By having a foundation provided directly on the seabed, river bed or stream bed, no secondary attachment to the seabed is necessary.

A part of the tether may comprise an element that is arranged to change or arranged to allow change of the distance between the anchoring and the vehicle during operation of the submersible power plant. The element that can change or allow change of the distance between the anchoring and the vehicle, can do so continuously over the entire predetermined trajectory or over parts of the predetermined trajectory. The element reduces the variation in speed of the vehicle over the predetermined trajectory. The element may allow power to be generated from the variation in distance between the vehicle and the structure by means of a transducer in addition to or instead of reducing the variation in speed of the vehicle over the predetermined trajectory. The speed at a certain point along the predetermined trajectory is calculated as the magnitude of the velocity at that point.

The unextended tether length is the tether length during non-operation, when essentially no forces other than possibly the vehicle's buoyancy act on the tether. In this condition, the tether, with or without an element, does not exhibit any lengthening. An extended tether length is the tether length during operation and depends on the forces acting on the vehicle. In case the tether does not comprise an element, the elasticity of the tether determines the extended tether length. In case the tether comprises an element, the elasticity of the element, and possibly also the tether, determines the extended tether length. During non-operation the element takes on an unextended length that is included in the unextended tether length. During operation the extended tether length is such that a depth equal to or greater than the clearance depth is always maintained.

In standard tethers, the distance between the vehicle and the structure changes due to that the tether is exposed to various tensile loads over the predetermined trajectory. The variation in tensile loads has a quadratic relation to the speed of the wing and thereby the vehicle. This variation in tensile loads leads to that the tether exhibits elastic lengthening and contraction over the predetermined trajectory, thereby changing the distance between the vehicle and the structure uncontrollably which may be undesirable in some cases and in some points of view.

Having a tether with an element that is arranged to change or arranged to allow change of the distance between the vehicle and the structure continuously over or during parts of the predetermined trajectory leads to a controlled smoothening of the speed over and/or between different parts of the vehicle's predetermined trajectory. With arranged to change means that the element is passive but has predetermined features, such as a spring constant which may be dependent on the properties of the submersible power plant, the site of the submersible power plant and other design features. To be arranged to allow change means that the element can be actively controlled so that the distance can be regulated within certain parameters.

The part of the tether that comprises an element may make up between approximately 5-15% the tether length. This allows for a good trade-off between the tether's durability and being able to design a tether with suitable characteristics. In one example, for a submersible power plant with a power rating of 100 kW, an element in the form of a polymer spring which is around 2.5 meters tall can handle the applied loads. The tether length for such a submersible power plant is approximately 20-40 meters, making the element 6.25-12.5% of the tether length. This is applicable also to submersible power plants with other power ratings, for instance by making the element wider. Further, it is preferable to have the element as close to the anchoring as possible, where the relative flow on tether is low. Tests have shown that 5-15% of the total tether length is a reasonable number for this.

The element may comprises one or more of: a spiral or coil spring, a disk spring stack, an elastomer spring or a gas spring.

The tether may be releasably attached to an anchoring coupling arranged to be releasable from the anchoring. The anchoring coupling may be movably attached to an anchor line running from the anchoring to a surface of the body of fluid, such that the anchoring coupling and tether can be brought to and from the surface. This enables the tether with the vehicle of the submersible power plant attached to it to be lowered or pulled down to the anchoring during installation of the vehicle of the submersible power plant or after maintenance or to be raised to the surface for maintenance.

The anchoring coupling may be buoyant. After the tether and vehicle is removed from the anchoring coupling, the tether and vehicle can be transported ashore for maintenance while the anchoring coupling remains in the body of fluid. The anchoring coupling can be marked by an identifier such as a buoy to be easily found once the vehicle and tether is to be reattached to the anchoring coupling and brought back from the surface. Alternatively, the tether can also be left behind, still attached to the anchoring coupling while only the vehicle is brought ashore for maintenance.

At least one turbine may be attached to the wing of the submersible power plant and connected to a generator for power generation during operation of the submersible power plant. Power generation can be made using a turbine connected to a generator. The turbine is brought to rotate by the vehicle's movement through the water. The power generated is transported to a shore facility through electrical cables arranged in the tether and from the anchoring and/or foundation to shore.

The vehicle may be arranged to move with a varying speed or essentially the same speed over the predetermined trajectory during operation. Depending on where along the predetermined trajectory the vehicle is, the speed of the vehicle may vary in order to control forces acting on the vehicle, tether and/or other parts of the submersible power plant. The speed at a certain point along the predetermined trajectory is calculated as the magnitude of the velocity at that point. Alternatively, the speed can be maintained essentially the same over the entire trajectory to obtain a more even power output.

The invention also relates to a method for providing a submersible power plant for producing electrical power. The submersible power plant comprises an anchoring and a vehicle comprising at least one wing. The vehicle is arranged to be secured to the anchoring by means of at least one tether. The vehicle is arranged to move in a predetermined trajectory by means of a fluid stream passing the wing during operation of the submersible power plant, the vehicle being arranged to stay in position essentially above the anchoring during non-operation of the submersible power plant, wherein the method comprises:

providing an anchoring at a minimum depth Dmin in a body of fluid, attaching a tether to the anchoring, the tether being connected to the vehicle, wherein the submersible plant is completely submerged in a body of fluid during operation and non-operation of the submersible power plant and the tether length is between approximately 2-20 times a wingspan of the wing, specifically between approximately 3-12 times the wingspan of the wing, more specifically between approximately 5-10 times the wingspan of the wing.

The method may further comprise: —providing a tether having a part that comprises an element that is arranged to change or arranged to allow change of the distance between the anchoring and the vehicle.

The method may further comprise: —providing the tether with an anchoring coupling releasably attached to the anchoring.

The method further comprises: —providing the anchoring with an anchor line to which the anchoring coupling is movably attached.

The method may further comprise: —providing the vehicle with at least one turbine attached to the wing of the vehicle connected to a generator for power generation during operation of the submersible power plant.

DETAILED DESCRIPTION

One reason behind selecting tether length depending on the wingspan of the wing is as follows. A deeper installation depth allows for larger vehicles, i.e. larger wingspans of the wing. When planning for an installation of an array of submersible power plants, water depths suitable for a given rated submersible power plant is first looked for. For an Island Mode installation (or islanding) of say a 200 kW unit, the flow characteristics at an installation site first determine the wingspan of the wing. An area in this site with sufficient water depth is then located. The anchoring can be installed at a suitable depth and can be for instance installed in a foundation placed directly in the seabed, an elevated foundation, at a local underwater peak or to an intermediate mooring in the water column somewhere for the vehicle to attach to.

Smaller vehicles can be installed also at deeper depths, but it is preferable to have the vehicle operating as close to the surface as allowed by local or global regulations, as the flow velocity is often higher in this part of the water column.

Figure 1:
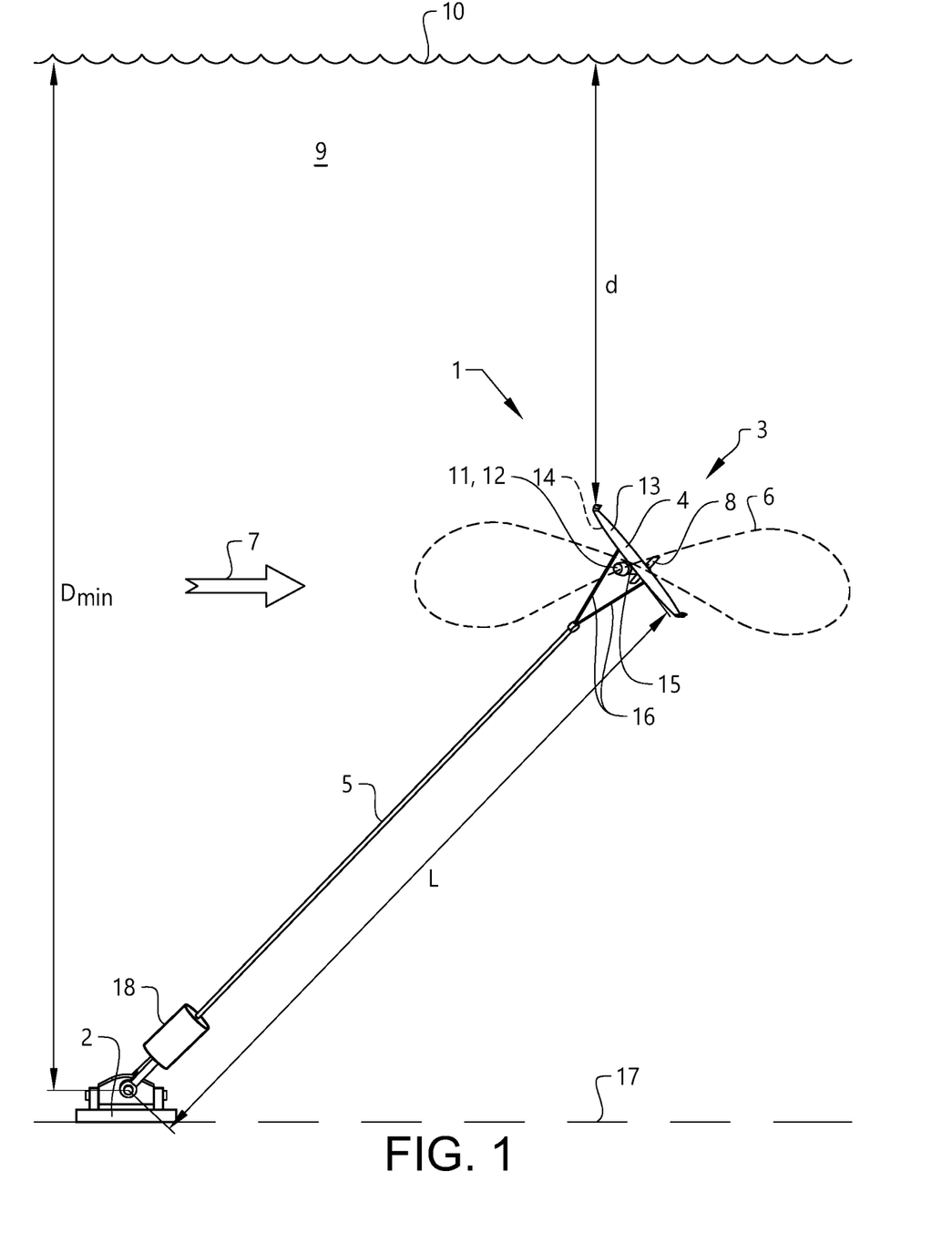
FIG. 1 schematically shows a submersible power plant according to the invention during operation, FIG. 2 schematically shows a submersible power plant according to the invention, during non-operation, FIG. 3 schematically shows the relation between tether length and the wingspan of the wing.

FIG. 1 schematically shows a submersible power plant 1 according to the invention during operation. The submersible power plant 1 comprises an anchoring 2 and a vehicle 3 comprising at least one wing 4. The vehicle is arranged to be secured to the anchoring 2 by means of at least one tether 5. The vehicle 3 is arranged to move in a predetermined trajectory 6 by means of a fluid stream 7 passing the wing 4 during operation of the submersible power plant.

When the vehicle 3 of the submersible power plant 1 is placed in a fluid stream 7, the fluid stream 7 moves over the wing 4 and creates lift. This causes the wing 4 to move due to the pressure differences between the different sides of the wing 4. The fluid stream 7 can for instance be a tidal stream or an underwater ocean current. By using one or more control surfaces 8, the wing 4 can be made to move along the predetermined trajectory 6. The control surfaces 8 can for instance be a rudder, ailerons, elevators, spoilers or any combination of ailerons, elevators, spoilers and rudders. In FIG. 1, the predetermined trajectory 6 is a figure-8 trajectory. The predetermined trajectory 6 can also be round, oval or other closed trajectories.

As can be seen from FIG. 1, the submersible power plant 1 is completely submerged in a body of fluid 9 during operation. With operation is meant that the vehicle 3 moves along the predetermined trajectory 6. In FIG. 1, a tether length L is shorter than a depth Dmin of the body of fluid 9 at an installation site. Both the depth Dmin and the tether length L are measured from a point where the tether 5 is attached to the anchoring 2. Dmin is determined by for instance license requirements (if any) for distance to surface (shipping lanes, diving birds or any other requirements) and other site parameters, such as wave conditions for example.

FIG. 1 is not necessarily to scale and is intended to illustrate the principle behind the disclosure. That the submersible power plant 1 is completely submerged means that there is always a minimum clearance depth d between the vehicle 3 and a surface 10 of the body of fluid. The condition of being completely submerged is fulfilled also during non-operation and at low tide. Non-operation means that the vehicle 3 is not moving along the predetermined trajectory 6. Non-operation can arise from a too low stream velocity, for instance when the direction of the tide changes or due to other conditions that prevents the vehicle from moving along the predetermined trajectory. The vehicle 3 may still move during non-operation as it can turn during rising and falling tides and vice versa. The clearance depth d varies and are is in some cases determined by national or international regulations. Present examples vary from between 5 meters for installation sites without shipping lanes passing overhead to 20 to installation sites with shipping lanes passing overhead.

The wing 4 of the vehicle 3 may in one aspect be equipped with at least one turbine 11 connected to a generator 12. The movement of the vehicle 3 through the fluid, powered by the fluid stream 7, causes the turbine 11 and generator 12 to rotate, thereby generating power during operation of the submersible power plant 1. The wing 4 of the vehicle 3 may be equipped with more than one turbine 11/generator 12 configuration. A turbine 11/generator 12 configuration may be attached to an upper side 13 of the wing 4 or a lower side 14 of the wing 4. The wing 4 of the vehicle 3 may comprise at least one nacelle 15 in which the turbine 11 and generator 12 can be housed. Parts of the systems can alternatively be built into the wing while a keel pod houses the turbine/generator only. Also the turbine/generator can be built into the wing.

The vehicle 3 also comprises struts 16 attaching the tether 5 to the anchoring 2. The anchoring can be positioned at a depth Dmin with the anchoring being attached to the seabed by means of for instance a chain, a second tether or similar.

The anchoring 2 can also be a foundation positioned on a bottom surface 17 such as a sea bed, lakebed or stream bed. The foundation is in such case preferably fixed or secured in place.

The vehicle 3 may further be arranged to move with a varying speed or essentially the same speed over the predetermined trajectory 6 during operation. This enables control of dynamic forces acting on the various parts of the submersible power plant 1. This is controlled by operating the one or more control surfaces 8. Alternatively, adjusting the position of one or more of the struts or adjusting the turbine speed can be used to control the speed of the vehicle.

A part of the tether 5 may comprise an element 18 that is arranged to change or arranged to allow change of the distance between the anchoring 2 and the vehicle 3. In tethers without an element, the distance between the vehicle 3 and the anchoring 2 changes due to that the tether 5 is exposed to various tensile loads over the predetermined trajectory 6. The variation in tensile loads has a quadratic relation to the speed of the wing 4 and thereby of the vehicle 3. This leads to that the tether 5 exhibits elastic lengthening and contraction over the predetermined trajectory 6 thereby changing the distance between the vehicle 3 and the anchoring 2 in an undesirable way as the tether 5 is continuously exposed to stress. The element 18 may be arranged to change or to allow change of the distance between the vehicle 3 and the anchoring 2 continuously over the entire predetermined trajectory 6 or during parts of the predetermined trajectory 6. With to change means that the element 18 is passive but has predetermined features, such as a spring constant which may be dependent on the properties of the submersible power plant 1, the site of the submersible power plant 1 and other design features. To allow change means that the element 18 can be actively controlled so that the distance can be regulated within certain parameters. Both options lead to smoothening of the speed over and/or between different parts of the predetermined trajectory 6. Speed is defined as the magnitude of the velocity of the vehicle 3 as it covers the predetermined trajectory 6.

Structural limitations set on the vehicle 3 are results of optimizations of product cost and total power output over time. The wing 4 may need to be large and efficient enough to extract/convert appropriate energy amounts during times with low flow speeds. The speed of such a relatively large and efficient wing 4 may then need limitations during times with higher speed flows in order not to exceed such optimized structural limitations.

A reduction of the amplitude of the variation of the forces acting on the various parts of the submersible power plant 1 is advantageous for e.g. material fatigue reasons. For power production reasons, the cubic relationship between speed and produced power needs to be considered. The power production is largely proportional to the integral of the cube of the speed, i.e. the area under the power curve. By lowering speed when high forces are acting on the vehicle 3 towards a certain average speed, the power production would be lowered to the power of three at those parts of the predetermined trajectory. This would in turn cause a quite significant power production loss. Correspondingly, if the speed dips are elevated towards the same certain average speed, the power production increase at those dips would be much less than the power production lost during the lowered peaks. A constant average speed with lowered amplitude of the speed variation would lead to a lowered power production.

With an increased average speed, which may be obtainable if the amplitude of the speed variation is decreased and the speed peaks are kept on the same level, an increased power output could be achieved. This would mean no loss of power at the peaks, but increased power production during all other parts of the speed curve. This is valid for spring tides, when peaks may need to be cut. During neap tides when peaks may not need to be cut power output increase would occur during the entire predetermined trajectory 6.

The speed or force curve may be raised to a higher mean value by means of e.g. a larger wing 4 or by the use of an installation site with higher flow speeds.

A decrease of the speed variation amplitude by using the element 18 to allow a change in the distance between the vehicle 3 and the anchoring 2 may also facilitate for economically feasible installation on sites with greater variations between neap tides and spring tides than otherwise would be possible if the speed of the vehicle 3 during neap tides can be raised without the peak speeds during spring tides becoming too high.

The element 18 may make up between 5-15% of the tether length. The element 18 may comprise one or more of: a spiral or coil spring, a disk spring stack, an elastomer spring or a gas spring.

Further, by connecting a transducer (not shown) to the element 18, electrical energy can be generated from the variation in distance between the vehicle 3 and the anchoring 2 by converting mechanical energy generated by the variation in distance to electrical energy.

Figure 2:
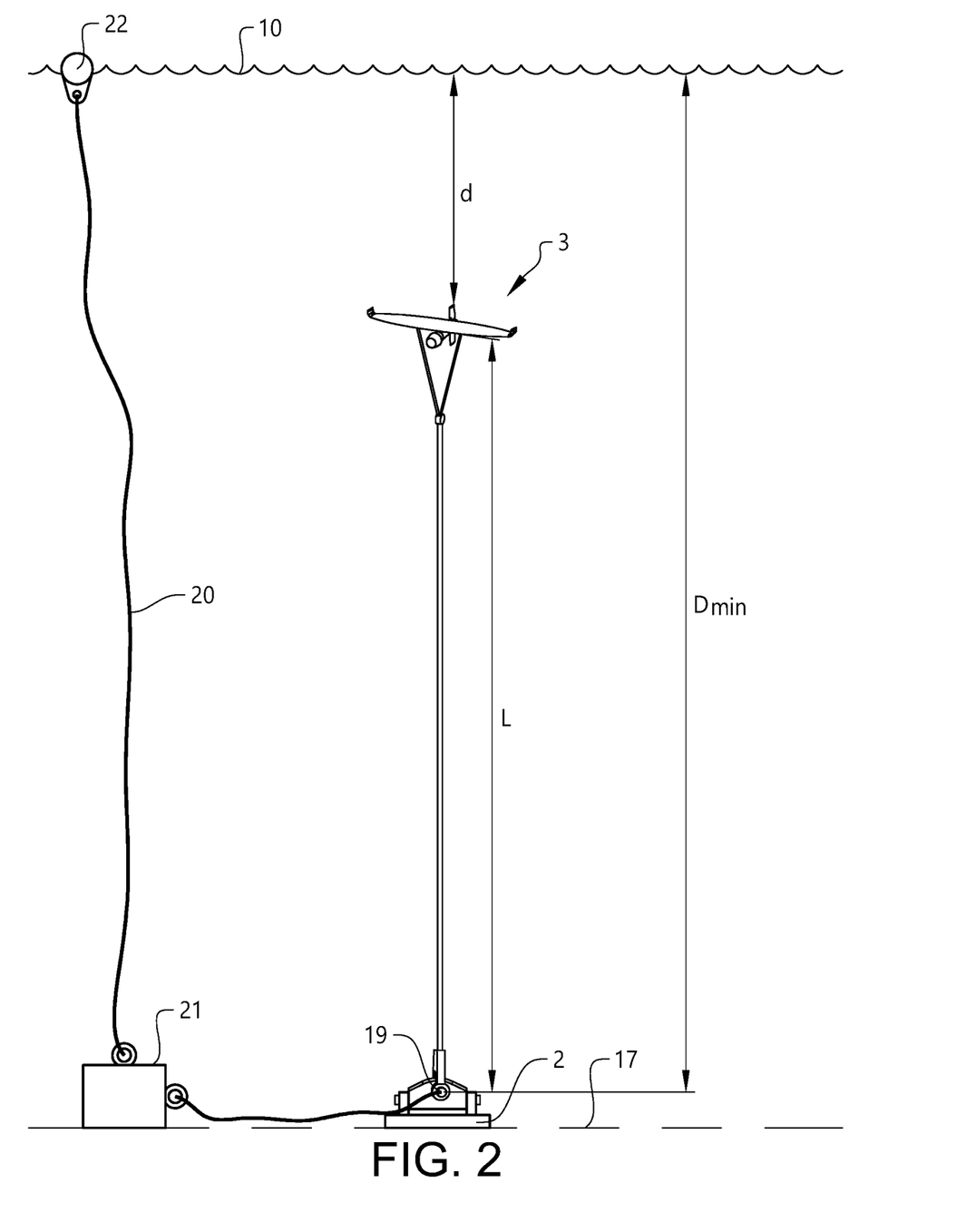

FIG. 2 schematically shows a submersible power plant 1 according to the invention, during non-operation when the anchoring 2 is a foundation provided on a seabed. As mentioned, non-operation means that the vehicle 3 does not move along the predetermined trajectory 6. The vehicle 3 may still move due to movement in the surrounding water, but no power will be produced. The vehicle 3 will be set up with a net buoyant force enabling the submersible power plant 1 to position the tether 5 vertically in slack water conditions when the submersible power plant 1 is installed in a tidal area. The buoyancy is achieved by designing and balancing the weight of the vehicle 3 and tether 5 against available total buoyancy of the entire submersible power plant 1. Alternatively, the submersible power plant 1 can be installed in or near an ocean current. Due to the permanency of motion in the ocean current, the buoyancy of the vehicle 3 can be the same or lower than when installed for tidal power generation.

The tether 5 and vehicle 3 are in one aspect one assembly which can be installed and recovered as one unit. In another aspect, the tether 5 and the vehicle 3 can also be connected by a joint, coupling or similar located somewhere between the vehicle 3 and the anchoring 2.

The tether 5 may be equipped with swivelling tether elements (not shown) over parts of or over the entire tether 5 in order to lower drag, protect the cable and/or introduce a net zero lift value on the tether 5 enabling the movement of the vehicle 3 of the submersible power plant 1 to be predictable in no-flow or low flow conditions.

As seen in FIG. 2, the tether 5 is releasably attached to an anchoring coupling 19. The tether is also rotatably attached to the anchoring 2 by means of the anchoring coupling 19 and attached to the vehicle 3 by means of at least one vehicle coupling (not shown). Alternatives are e.g. connecting the tether to a top joint where the vehicle has two front struts and one rear strut, connecting the tether to a top joint where the vehicle has front struts only, or the tether is connected directly to the nacelle. The anchoring coupling 19 is itself arranged to be releasable from the anchoring 2. The anchoring coupling 19 is temporarily or permanently movably attached to an anchor line 20 running from the anchoring 2 to the surface 10 of the body of fluid 9 in which the submersible power plant 1 is installed. The anchor line 20 runs to the surface 10 by first being run parallel to the bottom surface 17 to a weight 21 that secures or weighs down the part of the anchor line 20 running parallel to the bottom surface 17. From the weight 21, the anchor line 20 runs to the surface such that the anchoring coupling 19 and tether 5 can be brought to and from the surface 10. This ensures that the anchor line 20 does not interfere with the predetermined trajectory 6 during operation of the submersible power plant. Alternatively, the entire anchor line 20 can be kept at or near the bottom surface 17. The anchor line 20 can be released when the vehicle 3 and tether 5 needs to be recovered. Alternatively, a winch on the anchoring 2 or the anchoring coupling 19 can be used to move the tether 5 and/or vehicle 3 to and from the surface 10. Other systems not requiring a permanent line system are also conceivable.

In the example when the anchoring is at a depth Dmin which is not a seabed, lake bed or stream bed but instead is attached to the seabed far below the anchoring, the anchor line can be kept essentially horizontal and run a distance from the anchoring by means of an anchor line attachment (not shown) that is neutrally buoyant at essentially the same depth as the anchoring or also attached to the seabed far below the anchoring.

A surface end of the anchor line may be buoyant and may in one aspect comprise a floating marking means 22 in order to locate the anchor line 20 when the tether 5 and vehicle 3 is to be installed or re-installed after maintenance. The floating marking means 22 can for instance be a buoy, a radio transmitter, a visible light transmitter, a GPS marker or similar. A combination of marking means can be used to further simplify the location of the anchor line 20. The anchoring coupling 19 may be connected to the anchoring 2 by means of a winch or line extension to shore.

The anchoring coupling 19 is in one aspect buoyant. In one aspect, the anchoring coupling 19 comprises a marking means.

Figure 3:
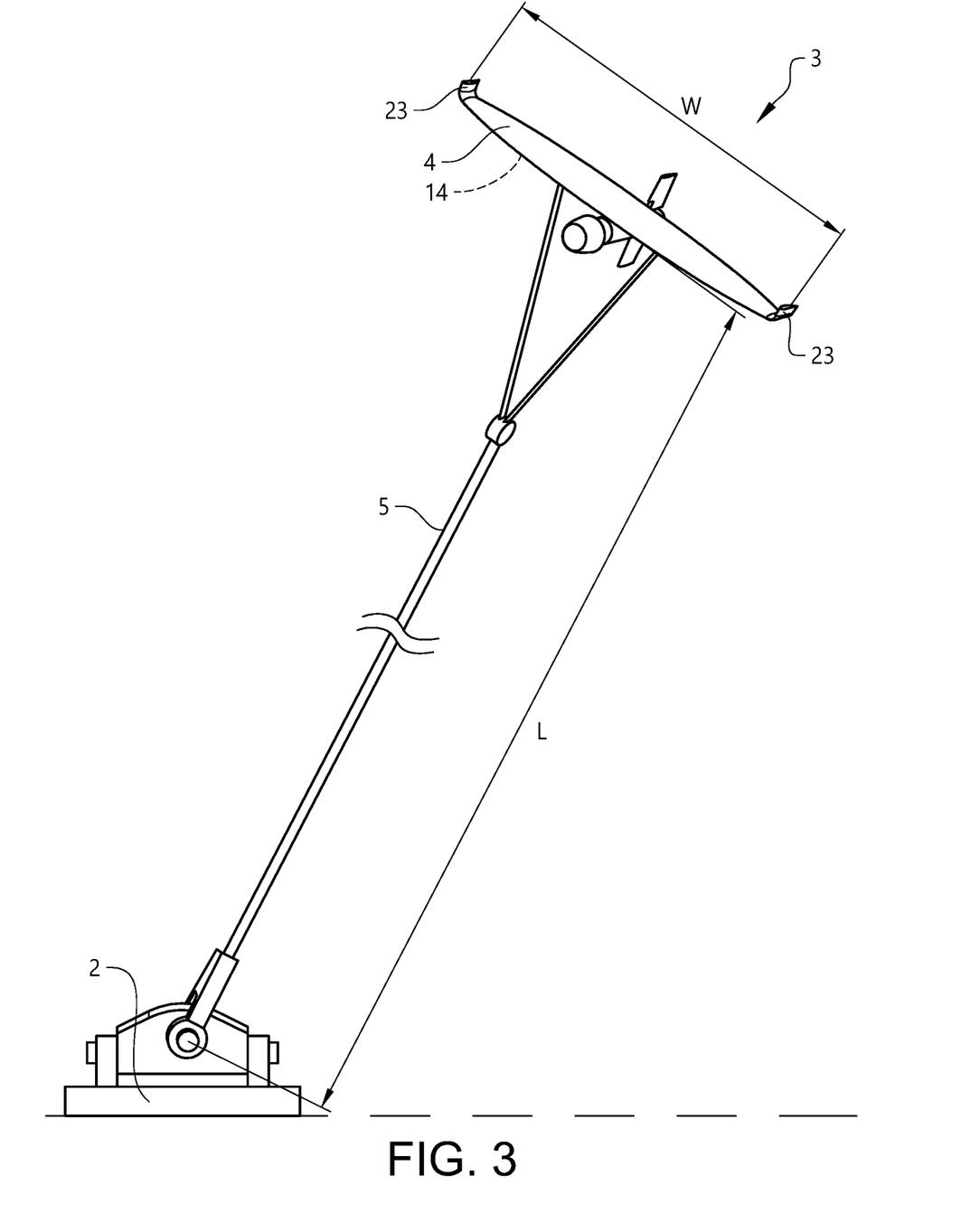

FIG. 3 schematically shows the relation between tether length L and a wingspan W of the wing 4. A tether length L is between approximately 2-20 times the wingspan W of the wing 4, specifically between approximately 3-12 times the wingspan W of the wing 4, more specifically between approximately 5-10 times the wingspan W of the wing 4.

The tether length L is measured as the distance of the tether 5 between the anchoring coupling 19 and the at least one vehicle coupling on the vehicle 3. The tether 5 normally comprises an attachment point such as a joint, coupling or similar between the tether 5 and the wing 4 of the vehicle 3. The tether length L includes the distance between the attachment point and the lowest point on the lower side 14 of the wing 4 of the vehicle 3.

The wingspan W of the wing 4 is measured from one wingtip to the other wingtip of the wing 4, i.e. the points of the wing 4 that are furthest from each other when viewing the wing 4 from above. As can be seen in FIG. 3, the wing 4 may comprise winglets 23 in order to reduce drag. The winglets 23 are not included in the measurement of the wingspan W.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description are to be regarded as illustrative in nature, and not restrictive. For instance the vehicle 3 does not necessarily need to be equipped with a turbine 11 for producing electrical energy. Electrical energy can be produced only by means of the transducer attached to the element 18.

The invention claimed is:

1. A submersible power plant for producing electrical power, the submersible power plant comprising an anchoring provided at a minimum depth and a vehicle comprising at least one wing, the vehicle being arranged to be secured to the anchoring by means of at least one tether rotatably attached to the anchoring by means of an anchoring coupling and attached to the vehicle by means of at least one vehicle coupling, the vehicle being arranged to move in a predetermined trajectory by means of a fluid stream passing the wing during operation of the submersible power plant, the vehicle being arranged to stay in a position essentially above the anchoring during non-operation of the submersible power plant,
wherein the submersible power plant is completely submerged in a body of fluid both during operation and non-operation of the submersible power plant and wherein the tether has an unextended tether length between 2-20 times a wingspan of the wing,
wherein the tether is releasably attached to the anchoring coupling and the anchoring coupling is releasable from the anchoring,
wherein the anchoring coupling is movably attached to an anchor line running from the anchoring to a surface of the body of fluid, such that the anchoring coupling and tether can be brought to and from the surface, and
wherein the anchoring coupling is buoyant.

2. The submersible power plant according to claim 1, wherein the anchoring is a foundation arranged on a seabed, lake bed or stream bed.

3. The submersible power plant according to claim 1, wherein a part of the tether comprises an element that is arranged to change or arranged to allow change of the distance between the anchoring and the vehicle during operation of the submersible power plant.

4. The submersible power plant according to claim 3, wherein the element makes up between 5-15% of the tether length.

5. The submersible power plant according to claim 3, wherein the element comprises one or more of: a spiral or coil spring, a disk spring stack, an elastomer spring or a gas spring.

6. The submersible power plant according to claim 1, wherein at least one turbine connected to a generator is attached to the wing of the submersible power plant for power generation during operation of the submersible power plant.

7. The submersible power plant according to claim 1, wherein the vehicle is arranged to move with a varying speed or essentially the same speed over the predetermined trajectory during operation of the submersible power plant.

8. The submersible power plant according to claim 1, wherein the unextended tether length is between 3-12 times the wingspan of the wing.

9. The submersible power plant according to claim 8, wherein the unextended tether length is between 5-10 times the wingspan of the wing.

10. A method for providing a submersible power plant for producing electrical power, the submersible power plant comprising an anchoring and a vehicle comprising at least one wing, the vehicle being arranged to be secured to the anchoring by means of at least one tether rotatably attached to the anchoring by means of an anchoring coupling and attached to the vehicle by means of at least one vehicle coupling, the vehicle being arranged to move in a predetermined trajectory by means of a fluid stream passing the wing during operation of the submersible power plant, the vehicle being arranged to stay in position essentially above the anchoring during non-operation of the submersible power plant, wherein the method comprises:

provides the anchoring at a minimum depth in a body of fluid, attaching the tether to the anchoring, the tether being connected to the vehicle, providing the tether with a buoyant anchoring coupling releasably attached to the anchoring, and providing the anchoring with an anchor line to which the anchoring coupling is movably attached, wherein the tether has an unextended tether length such that the submersible power plant is completely submerged in the body of fluid during operation and non-operation of the submersible power plant and the unextended tether length is between 2-20 times the wingspan of the wing.

11. The method according to claim 10, wherein the method further comprises:

providing the anchoring by providing a foundation on a seabed, lake bed or stream bed.

12. The method according to claim 10, wherein the method further comprises:

providing a tether having a part that comprises an element that is arranged to change or arranged to allow change of the distance between the anchoring and the vehicle during operation of the submersible power plant.

13. The method according to claim 10, wherein the method further comprises:

providing the vehicle with at least one turbine attached to the wing of the vehicle connected to a generator for power generation during operation of the submersible power plant.

14. The method according to claim 10, wherein the unextended tether length is between 3-12 times the wingspan of the wing.

15. The method according to claim 8, wherein the unextended tether length is between 5-10 times the wingspan of the wing.

* * * * *